United States Patent [19]
Louviere

[11] Patent Number: 6,101,791
[45] Date of Patent: Aug. 15, 2000

[54] METHOD OF MAKING A PLURALITY OF INTERCONNECTED VIALS

[76] Inventor: Kent A. Louviere, 116 Heritage Dr., Youngsville, La. 70592

[21] Appl. No.: 09/054,905

[22] Filed: Apr. 3, 1998

[51] Int. Cl.[7] .................................................. B29C 45/36
[52] U.S. Cl. ................... 53/467; 53/477; 264/297.2; 264/318; 264/328.8; 425/577; 425/588
[58] Field of Search ..................... 264/318, 334, 264/328.8, 297.2; 425/556, DIG. 5, DIG. 58, 577, 588; 249/64, 162, 144; 156/69, 308.4; 53/467, 477

[56] References Cited

U.S. PATENT DOCUMENTS

| | | | |
|---|---|---|---|
| 4,239,471 | 12/1980 | Swaroop | 425/144 |
| 4,472,131 | 9/1984 | Ryder | 425/548 |
| 4,502,660 | 3/1985 | Luther et al. | 249/144 |
| 4,634,366 | 1/1987 | Brun et al. | 425/526 |
| 4,717,113 | 1/1988 | Martin | 249/63 |
| 4,765,585 | 8/1988 | Wieder | 249/64 |
| 4,768,747 | 9/1988 | Williams et al. | 249/63 |
| 4,832,307 | 5/1989 | Watanabe et al. | 249/63 |
| 4,959,005 | 9/1990 | Sorensen | 425/577 |
| 5,015,426 | 5/1991 | Maus et al. | 264/40.5 |
| 5,040,963 | 8/1991 | Beck et al. | 425/130 |
| 5,139,714 | 8/1992 | Hettinga | 264/45.1 |
| 5,346,659 | 9/1994 | Buhler et al. | 264/68 |
| 5,407,344 | 4/1995 | Rombalski, Jr. et al. | 425/190 |
| 5,527,173 | 6/1996 | Miller et al. | 425/126.1 |
| 5,560,939 | 10/1996 | Nakagawa et al. | 425/139 |
| 5,595,771 | 1/1997 | Foltuz et al. | 425/443 |
| 5,653,934 | 8/1997 | Brun, Jr. et al. | 264/334 |
| 5,707,662 | 1/1998 | Bright et al. | 425/547 |
| 5,736,173 | 4/1998 | Wright et al. | 425/577 |

*Primary Examiner*—Jan H. Silbaugh
*Assistant Examiner*—Stefan Staicovici
*Attorney, Agent, or Firm*—Domingue & Waddell, PLC

[57] ABSTRACT

A device for molding a container having a first member including an opening defined therein. A manifold member, operatively attached to the first member for channeling a plastic fluid to an insert device is included. The insert devices are positioned within the opening located within the first member, with the insert containing a first slide and a second slide. The first slide and second slide will have an extended position and a contracted position, and wherein the contracted position defines a cavity profile. The second member will have a first end that contains a plurality of core pins. A piston is adapted to the second end of the second member for reciprocating the second member into engagement with the insert so that the first slide and second slide are moved to the contracted position. During the reciprocating motion, the plurality of core pins are received in the cavity profile. The apparatus will further comprise heater means for suppling a heat to the fluidized plastic. Also described herewith is a method of casting a container with a mold, with the container being used as a medical vial.

10 Claims, 13 Drawing Sheets

METHOD OF MAKING A PLURALITY OF INTERCONNECTED VIALS

BACKGROUND OF THE INVENTION

This invention relates to a method and apparatus for molding a container. More particularly, but not by way of limitation, this invention relates to an apparatus and method for molding a container that has a closed end and an opened end, and wherein a material may be placed therein followed by the closing of the open end.

The injection molding of plastics is used to create a number of different objects such as caps, lids, and other plastic components. The prior art injection molding will consist of melting a plastic into a fluid state and injecting the liquid plastic into a mold. The mold will generally consist of a first section and a second section. The first section and the second section cooperate to form a mold cavity. The liquid plastic is injected into the mold. Thereafter, the liquid plastic is allowed to cool. The molded plastic article is then ejected from the mold, as is understood by those of ordinary skill in the art.

Prior art patents such as U.S. Pat. No. 5,560,939 to Nakagawa entitled "MOLD ASSEMBLY COMPRISING A SLIDING MOLD INSERT ADAPTED FOR AUTOMATED INSERTION AND REMOVAL" provide a mold insert that is reciprocally movable with the mold insert coupling portion. Also, in U.S. Pat. No. 5,346,659 to Buhler et al entitled "METHOD FOR PRODUCING A WELD-LINE FREE INJECTION MOLDED PLASTIC CONTAINER BODY PORTION", the inventor describes an injection molding mechanism and method of its use for the formation in a single sequence of operation of weld-line free cylindrical container body having a central opening at one end. In yet another prior art device, U.S. Pat. No. 5,139,714 to Hettinga teaches a process for injection molding a hollow plastic article in which a low pressure heat-activated gas is injected in combination with a plastic material into a mold cavity of a plastic injection mold unit.

Despite these prior art molding techniques, there is a need for a mold apparatus and method that will produce a container that generally includes a closed end, an opened end, and a hollow inner member that can hold materials. For instance, the container may hold a medicine such as a drug in tablet form. Alternatively, the container may be capable of holding medicine in liquid form. After placement of the medicine within the container, the open end may be closed according to prior art techniques such as a heat seal.

SUMMARY OF THE INVENTION

A device for molding a container is disclosed. The device will include a first member including an opening defined therein. A manifold member operatively attached to the first end of the first member for channeling a plastic fluid to an insert means is included. The insert means are positioned within the opening located within the first member, with the insert containing a first slide and a second slide. The first slide and second slide will have an extended position and a contracted position, and wherein the contracted position defines a cavity profile.

The second member will have a first end that contains a plurality of core pins. A piston is adapted to the second end of the second member for reciprocating the second member into engagement with the insert so that the first slide and second slide are moved to the contracted position. During the reciprocating motion, the plurality of core pins are received in the cavity profile. The apparatus will further comprise heater means for suppling a heat to the manifold means so that the plastic remains fluid. In one embodiment, the manifold member comprises a first plate with a first channel therein for channeling the plastic fluid therethrough and a second plate with a second channel therein cooperating with the first channel from the first plate for channeling the plastic fluid to the insert means.

The apparatus will further contain a first water supply means connected to the insert to supply a water to the insert. The apparatus will further contain a second water supply means connected to the first member. In the preferred embodiment, a cast heater element, operatively attached to the heater means is positioned within the first member so that the plastic fluid is heated before entering the insert. The water supply means may also connect to the first slide and to the second slide.

The apparatus may further comprise a first spring means, operatively associated with the first insert, for biasing the first slide outward from the opening, and second spring means, operatively associated with the second insert, for biasing the second slide outward from the opening. In the preferred embodiment, the reciprocating member comprises a piston operatively attached to the second member and wherein the second member comprises a retainer plate operatively attached to the piston and a stripper plate being operatively attached to the piston, the stripper plate being selectively detachable from the retainer plate. Also, a third water supply means for supplying a water stream to the core pins, and a fourth water supply means for supplying a water stream to the retainer plate is included. The apparatus may further comprise a second insert, with the second insert being biased with a second spring means, operatively associated with the second insert.

Also described herewith is a method of casting a container with a mold. The mold will include a first member that has an opening defined within a first end. The mold will further include a manifold member operatively attached to the first end of the first member for channeling a plastic fluid to an insert means. The insert means is positioned within an opening located within the first member, the insert means containing a first slide and a second slide, with the first slide and second slide having an extended position and a contracted position.

The mold will also contain a second member having a plurality of core pins contained thereon; and, a piston adapted to the second member for reciprocating the second member into engagement with the insert means. Therefore, the method comprises heating a plastic so that a plastic fluid is formed, and thereafter channeling the plastic fluid into the manifold. Next, the plastic fluid is heated within the manifold and the plastic fluid is channeled through the first member and into the first slide and second slide. Next, the piston is moved so that the second member contacts the first slide and the second slide which in turn causes the contraction of the first slide and the second slide so that a cavity profile is formed. The core pins are placed into the cavity profile. The method allows for the injection of the plastic fluid into the cavity profile, and in turn, casting the plastic fluid about the core pins so that a container is formed.

In one embodiment, the first member further comprises cast heaters operatively associated with the first and second slide, and wherein the method further comprises heating the plastic fluid with the cast heaters, and wherein the step of channeling the plastic fluid through the first member and into the first and second slide includes flowing the plastic fluid through the cast heater so that the plastic fluid is maintained at a constant temperature.

The method further comprises introducing a first water stream into the first slide and introducing the first water stream into the second slide. The first water stream is circulated within the first member, and then exited from the first member. A second water stream may be introduced into the core pins, and the method includes circulating the second water stream within the core pins. Next, the second water stream is exited from the plurality of core pins. In the preferred embodiment, the temperature of the plastic fluid within the manifold is measured. The temperature of the heater is adjusted in order to maintain the fluidity of the plastic. The method may further include measuring the temperature of the plastic fluid within the first slide and the second slide and adjusting the temperature of the cast heater in order to maintain the plastic fluidity.

The mold may further contain an ejector plate operatively associated with the second member. The method further consist of reciprocating the piston away from the first end of the first member and allowing the first slide and second slide to expand. Next, the piston is reciprocated so that the ejector plate traverses the plurality of core pins so that the container surrounding the core pins is ejected.

The method may also include filling the container with a material. The material may be a drug in tablet form, or alternatively, the material may be a drug in a liquid form. A precise amount of material may be placed within the container. After the material is placed therein, the method may further include sealing the container by sealing the open end of the container.

An advantage of the present invention includes the production of a hollow plastic article. Another advantage is the production of a container having a first end that is closed, and a second end that is opened. Yet another advantage is that after processing, the container can be filled with a material; thereafter, the open end may be sealed. Another advantage is that the material to be placed within the container may include a drug in liquid form or tablet form. Still yet another advantage is that an exact amount of the material (such as a pharmaceutical prescription) may be added into each individual container, and thereafter sealed. Another advantage is the use of a resin that allows for suitable flow properties during injection. Yet another advantage is the process leaves a small seam parting line about the produced product.

A feature of the present invention includes having a mold that contains a first stationary mold half and a second traveling mold half. Another feature of the present invention includes use of a sliding insert which is constructed in two cooperating halves. The sliding insert is fitted into an opening within the stationary mold half. Yet another feature includes the sliding insert is biased within the opening so that there is an expanded position. Another feature includes that the sliding insert may be biased into a contracted position by the traveling mold half.

Another feature includes a cavity profile is formed when the sliding insert is moved to the contracted position. In the preferred embodiment, the sliding insert contains a plurality of cavity profiles. Another feature includes a core pin is positioned on the traveling mold half, with the core pin being sized as to fit into the cavity profile. Still yet another feature includes a plurality of core pins may be attached to the traveling mold half, that cooperate with the cavity profiles of the sliding insert. Still yet another feature includes the core pins within the cavity profile form an annulus into which the plastic fluid is injected.

Yet another feature is the application of heat means to heat the manifold in order to keep the fluid plastic at the proper temperature. Another feature is the application of cast heaters to keep the plastic fluid at the proper temperature within the cavity profile during injection. Still yet another feature includes use of a water stream that cools the sliding inserts. Another feature is the use of a water stream injected within the core pin in order to cool the core pin. Yet another feature is having a free standing core pin that is not anchored within the cavity profile during the injection process.

DETAILED DESCRIPTION OF THE PREFERRED EMBODIMENTS

Figure 1:
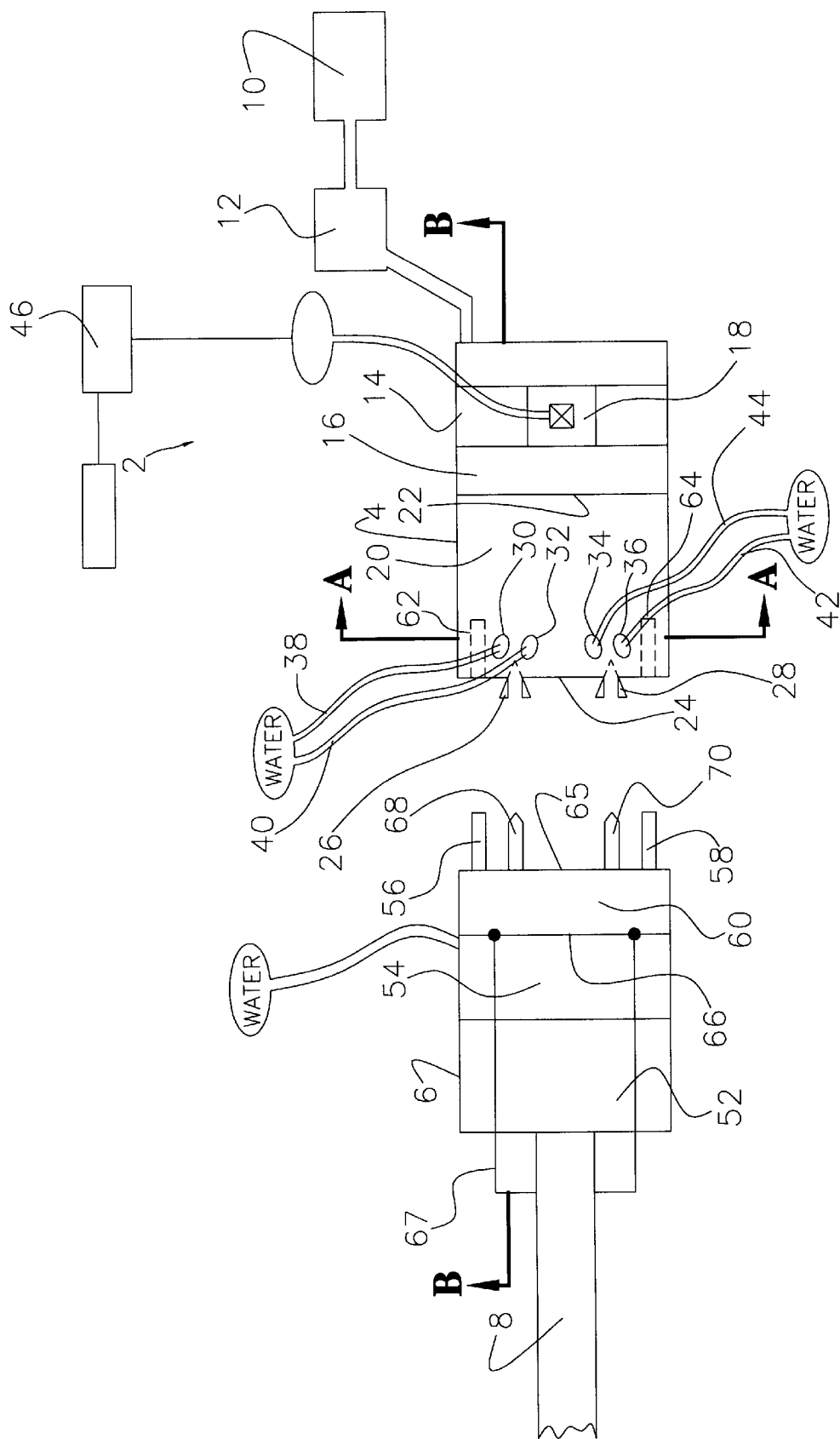
FIG. 1 is a perspective view of the mold apparatus of the present invention.

Referring to FIG. 1, a perspective view of the mold apparatus 2 of the present invention will now be described. The mold apparatus 2 generally consist of a first member 4 (also referred to as the hot half) that will be stationary during the process herein disclosed as well as a second member 6 (also referred to as the cold half) that is reciprocally movable into engagement with the first member 4 via the piston 8. The mold apparatus 2 will have operatively associated therewith a plastic supply 10 that is fed into a heater bin 12 where the plastic is made into a fluid (sometimes referred to as fluidize) so that the plastic can be flowed through the mold as will be further described. In the preferred embodiment, the plastic supply used is a resin which can be purchased from Dow Chemical Company under the trade name Metallocene Resin PT 1450. It has been found by applicant that this plastic resin sustains superior flow and curing properties under the system and method herein disclosed. During injection, this resin exhibits superior flow and cure properties so that the fluid plastic may be injected about the free standing core pin. The prior art injection molds exhibit poor flow qualities about free standing core pins (such as the free standing core pin described herein); therefore, the teachings of this application solve this problem. Also, the novel system (including the disclosed resin) leaves an acceptable seam-line about the produced product. Prior art products contain large seam lines which are undesirable for several reasons including but not limited to an inherently weak joining plane as well as being bulky.

The first member 4 will comprise a manifold plate 14 that contains therein an inlet for receiving the fluid plastic as well as a channel means for channeling the fluid plastic to the retainer plate 16. The manifold plate 14 will also contain heating means 18 for heating the manifold plate 14. The heating means 18 generates an electrical heat that keeps the plastic fluid at the proper temperature in order to ensure the proper flow properties, as will be understood by those of ordinary skill in the art.

The retainer plate 16 is operatively attached to the mold base 20, with the mold base 20 having a first end face 22 and a second end face 24. The first end face 22 is attached to the retainer plate 16 and receives the fluid plastic. The second end face 24 will cooperate with the second member 6 as will be more fully explained. The second end face 24 contains an opening that will have disposed therein the slide insert members 26 and 28. The slide insert members 26, 28 are constructed in halves, with insert members 26, 28 being biased outward from the second end face 24. The slide insert members 26, 28 are wedged shaped. The slide insert members 26, 28 accommodate an extended position (such as shown in FIGS. 1 and 3) as well as a contracted position (as shown in FIG. 2). The slide insert members 26, 28 will be described in greater detail later in the application.

Also as seen in FIG. 1, the mold base 20 contains the openings 30, 32, 34, 36, with these openings allowing communication of a water stream line to the slide insert members 26, 28. Thus, the opening 30 will have the input/output water lines 38, the opening 32 will have the input/output water lines 40, the opening will have the input/output water lines 42, and the opening will have the input/output water lines 44.

The mold apparatus 2 will also have operatively associated therewith the controller means 46 for controlling the injection process which includes the injection of fluid plastic, measuring and adjusting the heat means and cast heaters, as well as monitoring the water input and output lines. The controller means 46 is well known in the art and is commercially available from American MSI Corporation under the mark 38 Zone Delta.

The second member 6 will generally consist of a bottom clamp plate 52, with the bottom clamp plate 52 being operatively attached to the piston 8. The retainer plate 54 is, in turn, operatively attached to the bottom clamp plate 52, with the retainer plate 54 having extending therefrom the guide pins 56, 58. The guide pins 56, 58 will cooperate with and serve as a guide rail for the ejector plate 60 as well as serving to guide the second member into engagement with the first member 4 by insertion of the guide pins 56, 58 into the cooperating apertures 62, 64. The ejector plate 60 has a first face 65 and a second face 66. The ejector plate 60 is selectively detachable from the second member 6 via the secondary piston 67.

The core pins 68, 70 are also depicted in FIG. 1. The core pins 68, 70 are operatively attached to the retainer plate 54, with the core pins 68, 70 extending outwardly through apertures contained in the ejector plate 60. The core pin 68 will be received within the slide insert 26 while the core pin 70 will be received within the slide insert 28. It should be noted that in the preferred embodiment, the retainer plate 54 may contain two rows of pins that would cooperate with two corresponding rows of insert members, with this feature being described in greater detail later in the application. The apparatus 2 will also contain a water input/output stream that will be fed into the second member 6 and ultimately into the core pins 68, 70.

Figure 2A:
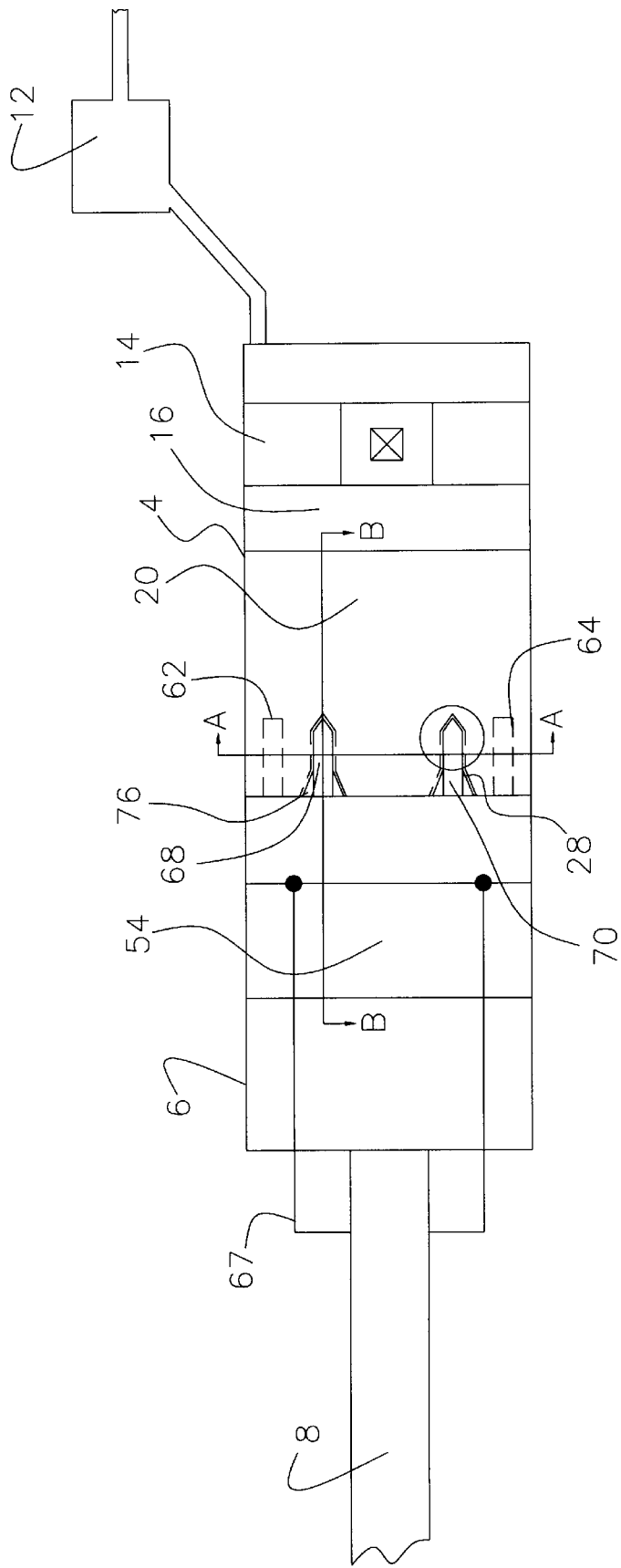
FIGS. 2A & 2B are the mold apparatus of FIG. 1 with the cold half of the mold advanced against the hot half of the mold.

Referring now to FIG. 2A, the mold apparatus 2 of FIG. 1 with the second member 6 (also referred to as the cold half) of the mold is seen advanced against the first member 4 (also referred to as the hot half) of the mold. It should be noted that like numbers appearing in the various figures refer to like components. Thus, the second member 6 has been advanced via the piston 8. The core pins 68, 70 have been advanced into the slide members 26, 28 respectively. The first face 65 is now abutted against the second face 24 of the first member 4. The advancement of the core pins 68, 70 and the second member 6, and in particular the first face 65, acts to contract the slide insert members 26, 28 via the biasing means. Once the insert slide members are contracted (as in the position seen in FIG. 2), a profile cavity is formed. The core pin inserted within the profile cavity will form an annulus into which the fluid plastic will be injected.

Figure 2B:
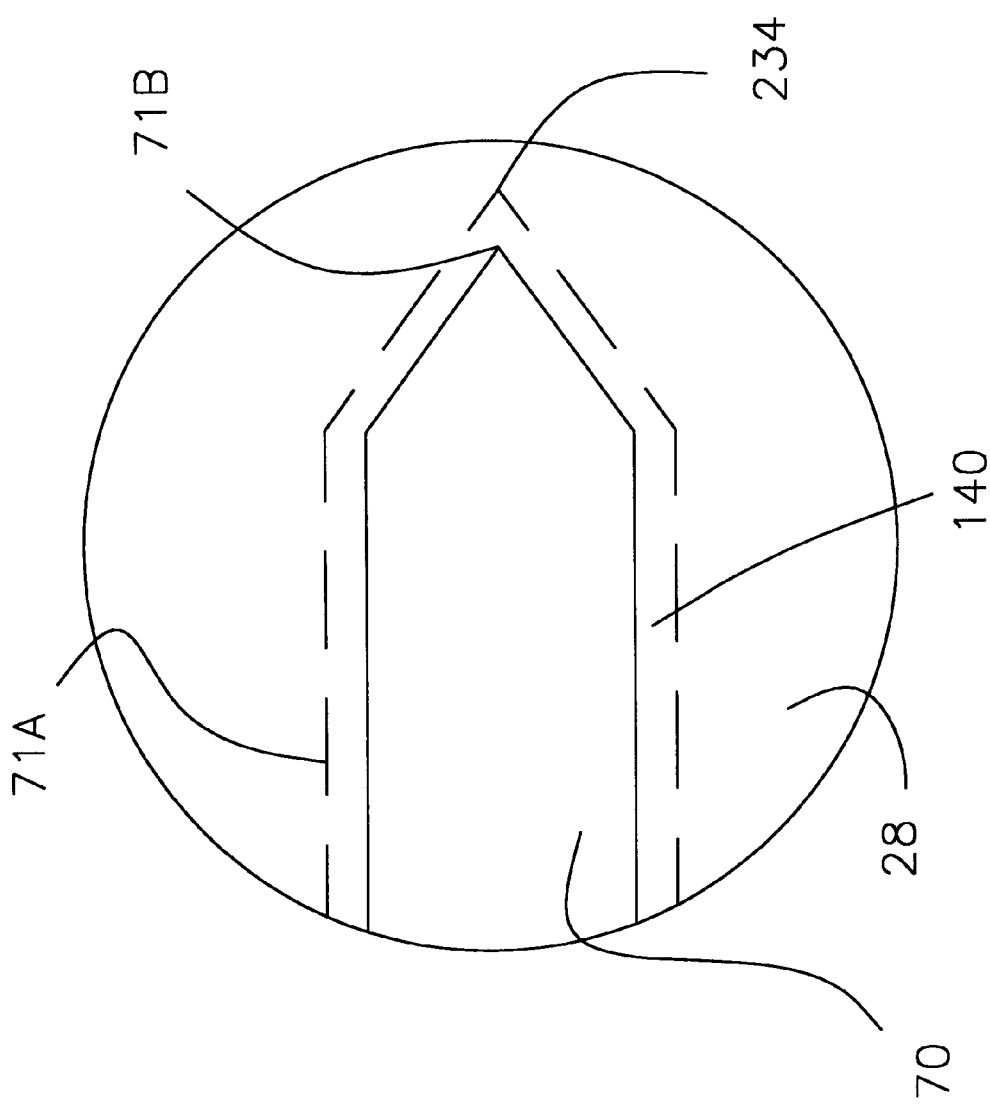
Figure 3:
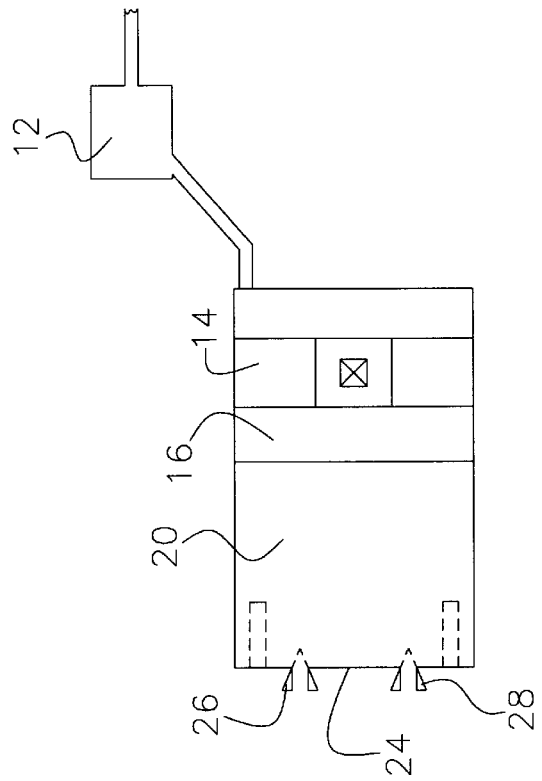
FIG. 3 is the mold apparatus of FIG. 1 with the cold half having been retreated and with the ejector plate advanced.
Figure 3:
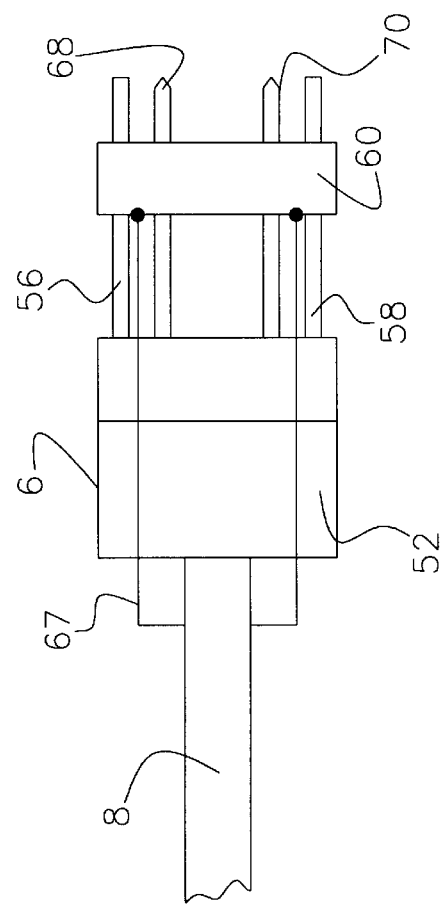

FIG. 2B is an expanded view of the core pin 68 received within the cavity profile 71A. The core pin 68 is not anchored within the cavity profile 71A. Instead, according to the novel teachings of this invention, the core pins 68 will be free standing within the cavity profile as depicted in FIG. 2B. This is accomplished by use of the novel design of the slide insert 26, 28. Additionally, use of the said resin (Metallocene) allows for proper thickness of the resin between the tip 71B of the core pin 68 and the insert 28. Thus, the fluid plastic is injected about the pin 68 without core pin 68 deflection. As mentioned earlier, the free standing core pins within a cavity profile have caused problems with the prior art injection molds including but not limited to the deflection of the core pin which in turn causes the product to have walls of irregular thickness, etc.

Once the fluid plastic is injected, the piston will retract so that the second member 6 is again placed in the position as seen in FIG. 1. At this time, a container of plastic is formed about the core pins 68, 70. Next, the process entails moving the ejector plate 60 via the secondary piston 67 so that the ejector plate 60 is advanced as seen in FIG. 3. The act of advancing will cause the plastic container disposed about the core pins to be ejected from the core pins. Also, the biasing means that act against the slide insert member 26, 28 will bias the slide insert members 26, 28 outward as seen in FIG. 3. Thereafter, the secondary piston 67 will retract causing the ejector plate 60 to travel to the position seen in FIG. 1. The process for injecting another series of articles may commence.

Figure 4A:
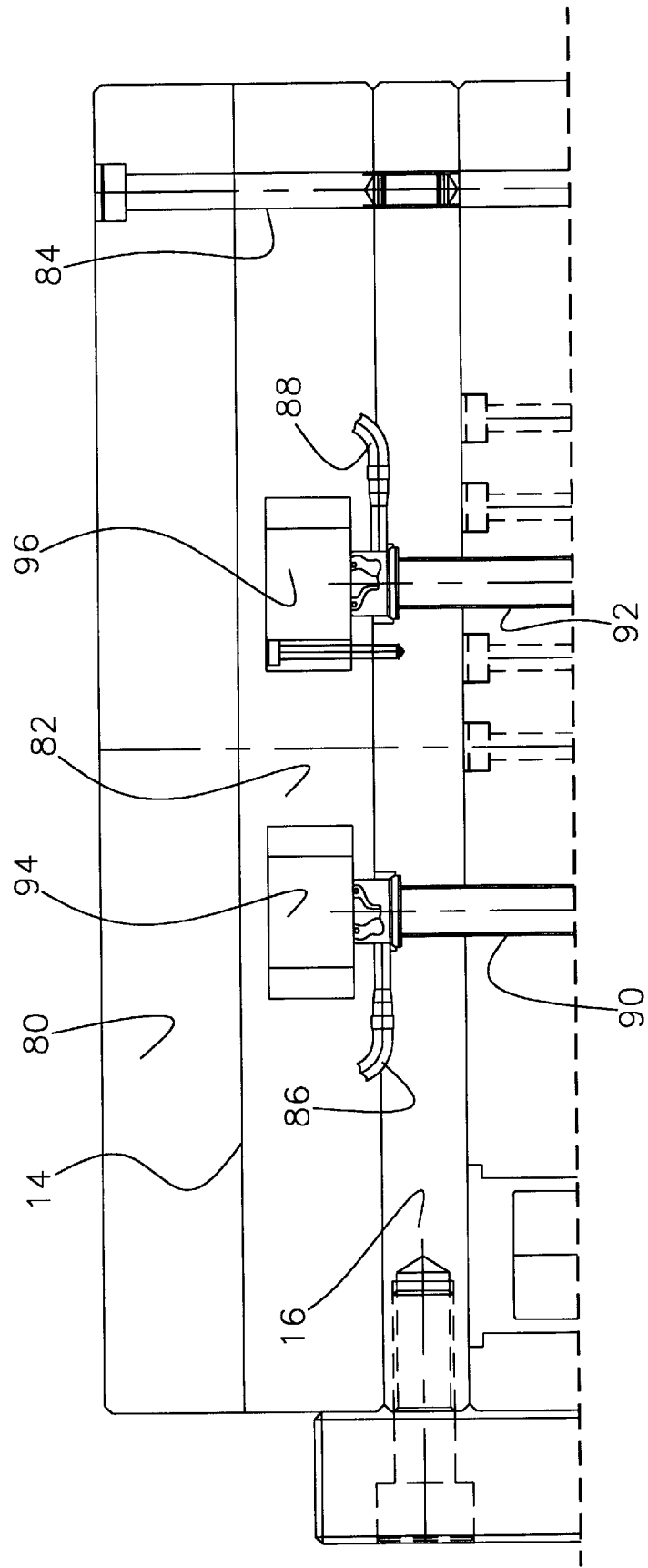
FIGS. 4A & 4B are a cross-sectional view of the mold apparatus taken along line A—A of FIG. 2.
Figure 4B:
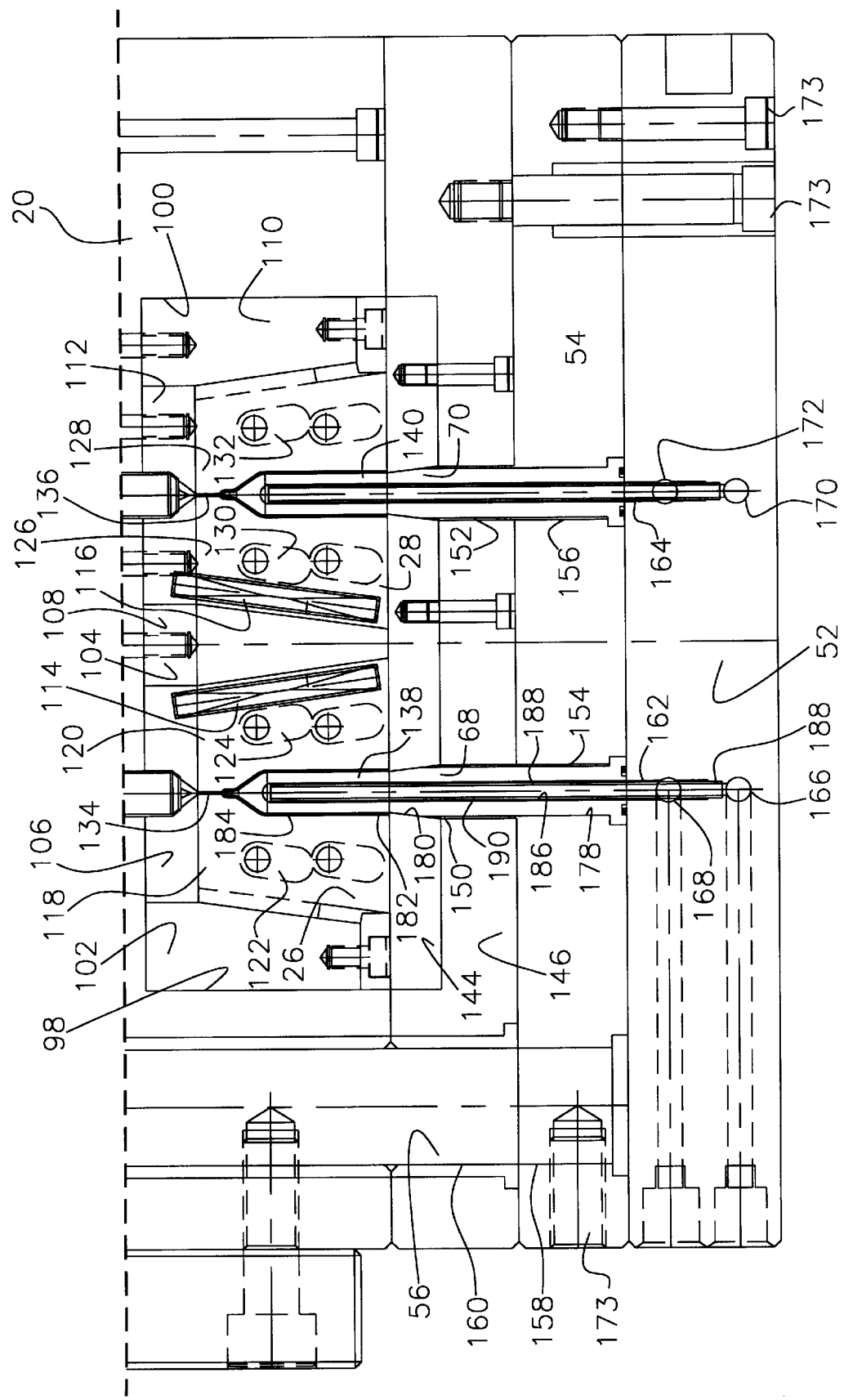

Referring now to FIGS. 4A–4B, a cross-sectional view of the mold apparatus 2 taken along line A—A of FIG. 2 will now be described. The first member 4 contains the manifold plate 14 which consist of a first section 80 and a second section 82, with the first section and second section containing the opening 84 for placement of a bolting member. The first member 4 further contains the retainer plate 16 that will have disposed therein channels for placement of the electrical wiring members 86 and 88 with the wiring members 86, 88 leading to the cast heater elements 90, 92. The cast heating elements 90, 92 are disposed within cavities within the retainer plate 16 as well as the mold base 20. The cast heating elements 90, 92 are generally tubular and will have an inner bore through which the fluid plastic will flow. The fluid plastic will be channeled from within the manifold 14 to the compartments 94, 96 and into the bore of the heating elements.

The mold base 20 will have openings 98, 100 for placement of the slide insert members 26, 28. In the preferred embodiments, the slide insert member 26 contains lock members 102, 104 associated with a retainer plate 106. The slide insert member 28 contains lock members 108, 110 associated with a retainer plate 112. The slide insert member 26 has the biasing means 114 for biasing the slide insert 26 outward, while the slide insert member 28 has the biasing means 116 for biasing the slide insert 28 outward. Also, the slide cams 118, 120 are included, with the slide cam 118 having the opening 122 and the slide cam 120 will have the opening 124 so that the water lines may be passed to the cams. The slide cams 126, 128 are also included, with the slide cam 126 having the opening 130 and the slide cam 128 will have the opening 132 so that the water lines may be passed to the fitted therein.

The slide cams 118 and 120 will come together to form the cavity profile into which the core pin 68 is fitted while the slide cams 126, 128 will come together to form another cavity profile into which the core pin 70 will cooperate. When the slide cams are retracted (as shown in FIGS. 4A and 4B) a first passage 134 and a second passage 136 is formed so that the fluid plastic may pass from the inner bore of the cast heaters to the annulus areas 138 and 140 of the cavity profiles. It should be noted that the mold base 20 will contain the openings for insert of the guide rails 56, 58.

The second member 6 will be described with reference to FIG. 4B. The second member 6 will contain a stripper insert 144 that is in turn attached to the ejector insert 146 and are collectively referred to as the ejector plate 60. As seen in FIG. 4B, the stripper insert 144 and ejector insert 146 are attached in order to operate together. The ejector plate 60 is selectively detachable from the retainer plate 54. The ejector plate 60 and retainer plate 54 both contain openings that has disposed therethrough the core pins 68, 70. As shown in FIG. 4, the ejector plate 60 has the openings 150, 152 and the retainer plate 54 has the openings 154, 156. The retainer plate 148 and the ejector plate 60 contain the openings 158, 160 respectively, for placement of the guide pins 56 (not shown is the guide pin 58).

The retainer plate 54 is in turn connected to the bottom clamp plate 52, as previously described, which in turn is connected to the piston 8. The bottom clamp plate 52 will contain the openings 162, 164. The opening 162 aligns with the openings 154, 150 and opening 164 aligns with the openings 156, 152. The core pin 68 is disposed in opening 162 and the core pin 70 is disposed in the opening 164. The core pins will generally consist of a cylindrical member that contains an inner bore, with the core pins being described in greater detail later in the application. The inner bore contains a concentric tubular member that forms an annulus. The bottom clamp plate 52 will contain a first channel 166 and a second channel 168 for a water stream input and output, with the first channel 166 injecting the water stream into inner bore and into the annulus and the second channel providing an outlet for the water stream from the annulus. There are also included the third channel 170 and fourth channel 172 that are provided for inputting and outputting a water stream to the core pin 70. The FIG. 4B also depicts the bores 173 for placement of attaching means such as bolts for attaching the various plates together.

Figure 7:
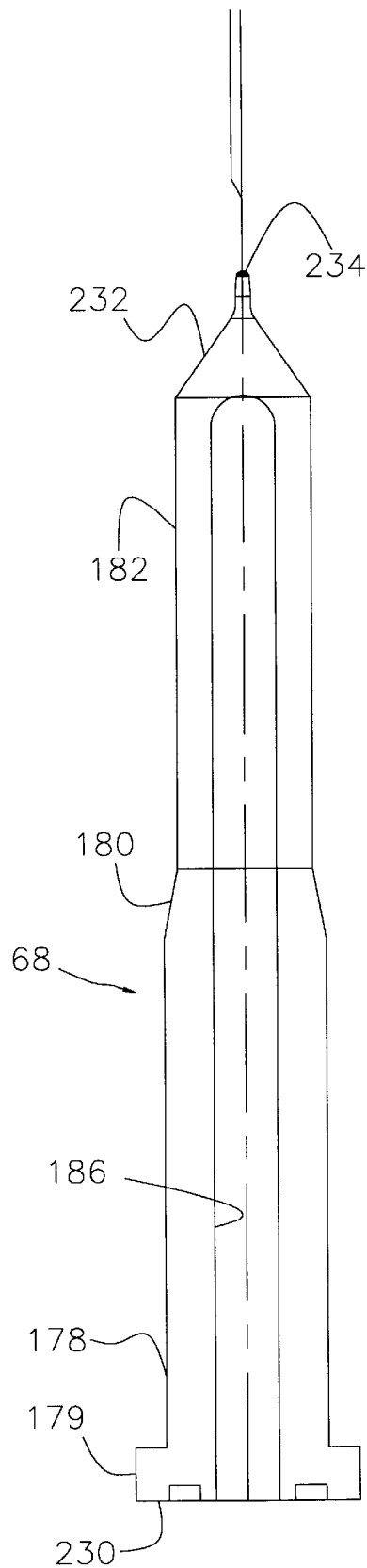
FIG. 7 is a cross-sectional illustration of a core pin.

The core pins disclosed herein are all of similar construction. The core pin 68 as seen in FIG. 7 has a first cylindrical surface 178 that includes a flanged section 179 with a seal therein, with the surface 178 surface extending to the chamfered surface 180 that in turn stretches to the second surface 182. As previously stated, an annulus 184 is created within the slide insert for injection of the fluid plastic. It should be noted that a metal-to-metal seal between the surface 180 and the plate 144 is formed so that the fluid plastic can not flow through the cold half 6. As noted earlier (and as seen in FIG. 4B), the core pin 68 contains the inner bore 186, with the inner bore 186 receiving a tubular member 188, with the tubular member 188 and the inner bore 186 forming another annulus 190. Thus, the water stream may be directed to the inner bore of the tubular member 188, out one end of the tubular member 188 and into the annulus 190, with the water channel 168 allowing an output for the water stream.

Figure 5A:
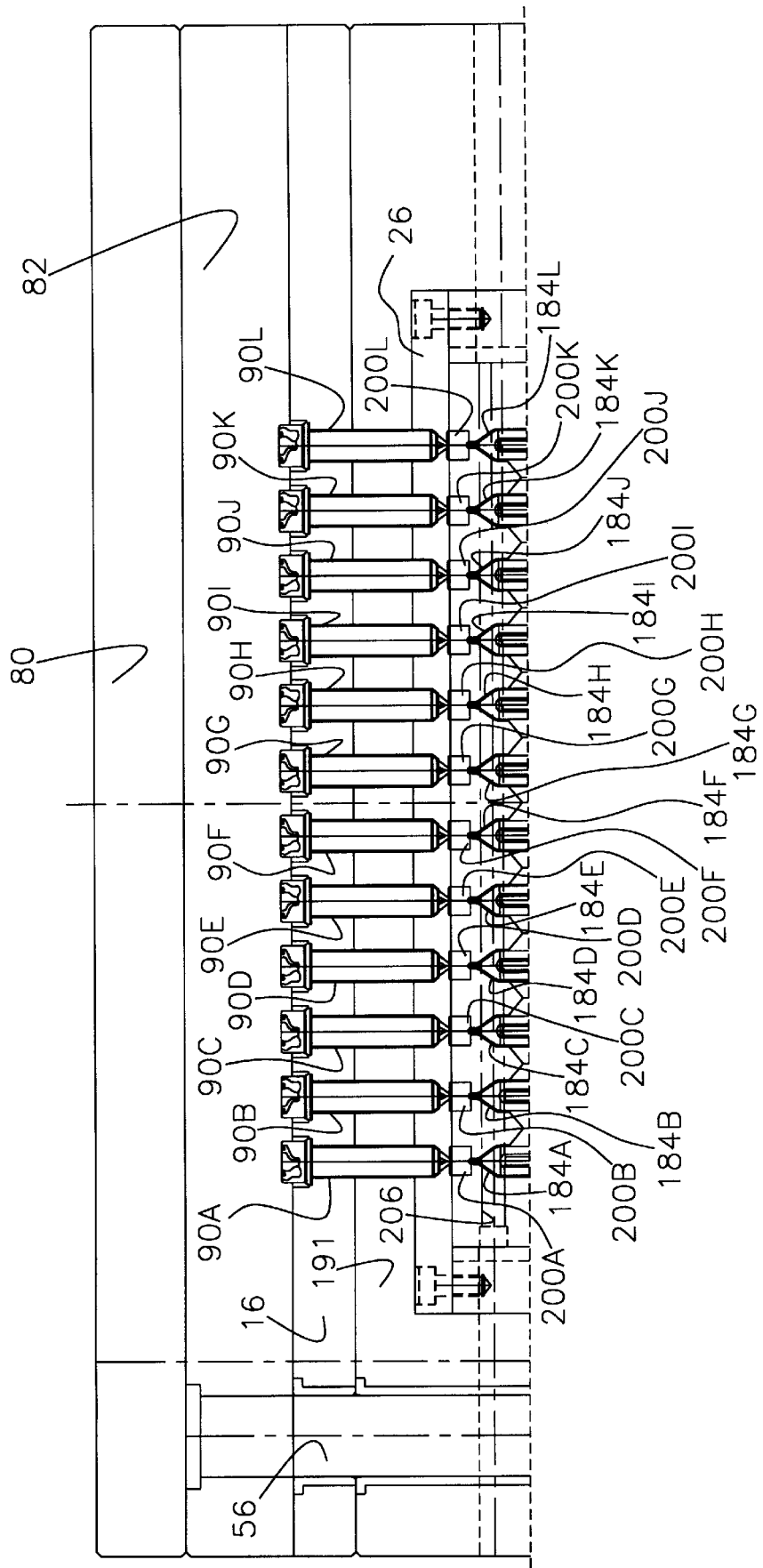
FIGS. 5A & 5B are a cross-sectional view of the mold apparatus taken along line B—B of FIG. 2.
Figure 5B:
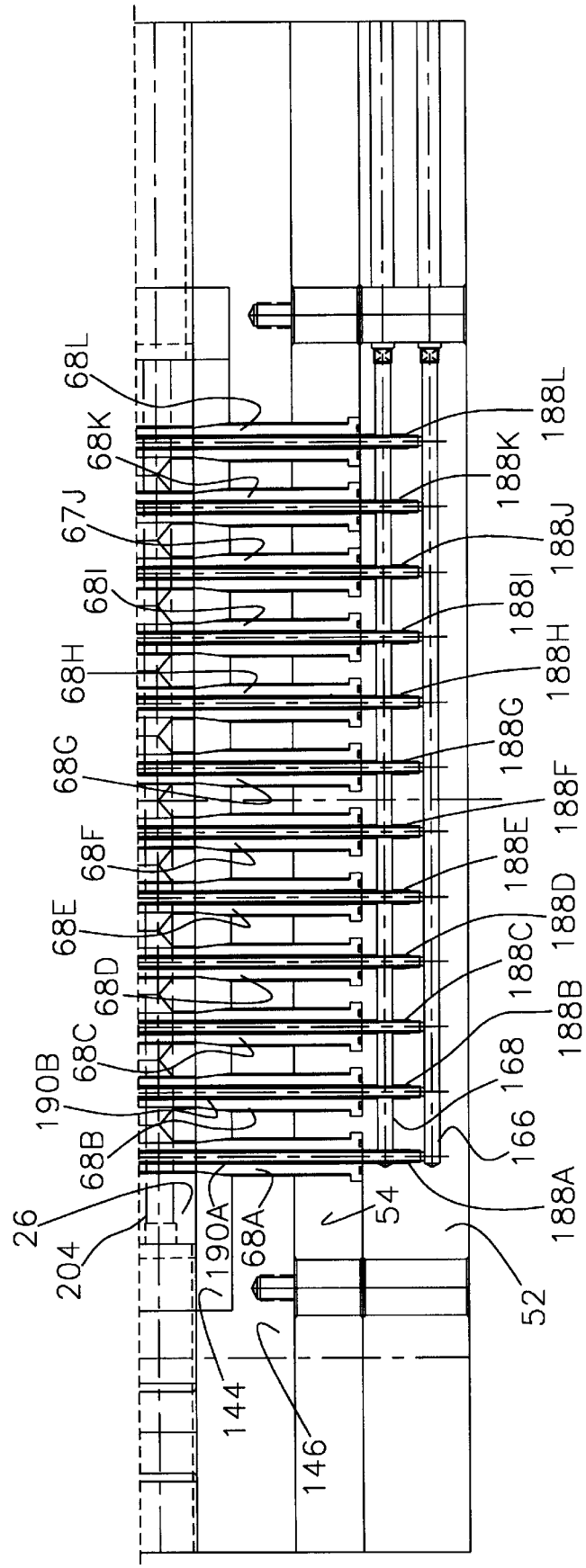
Figure 8:
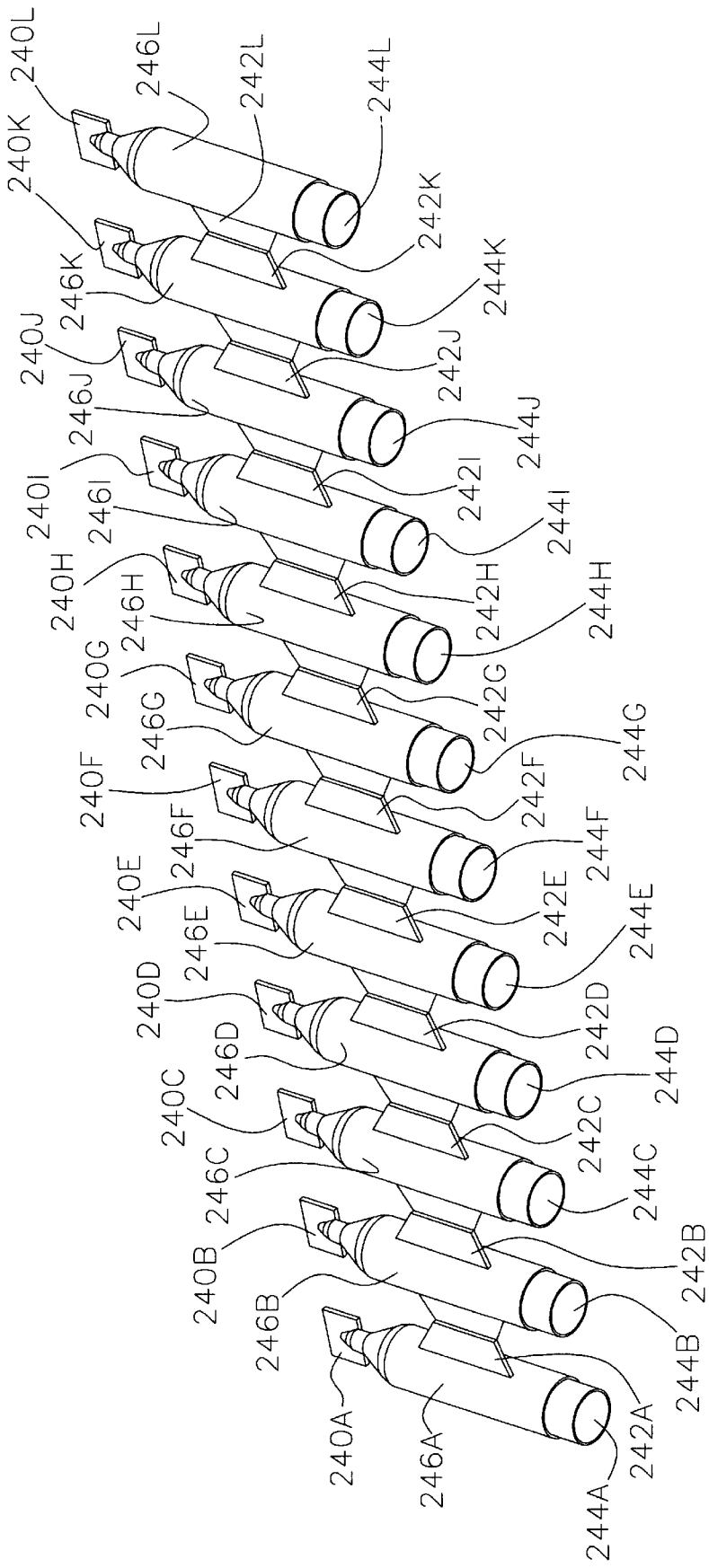
FIG. 8 is a perspective view of a row of molded hollow plastic articles.

Referring now to FIGS. 5A–5B, a cross-sectional view of the mold apparatus 2 taken along line B—B of FIG. 2 will now be described. Thus, the apparatus 2 includes the first section 80 that is operatively attached to the second section 82, which in turn leads to the gate insert 191. As illustrated in FIG. 5A, the preferred embodiment contains a row of cast heater elements including 90A, 90B, 90C, 90D, 90E, 90F, 90G, 90H, 90I, 90J, 90K, 90L. The row of cast heater elements leads to the slide insert member 26. When the slide insert member 26 is in the contracted position (as seen in FIGS. 5A and 5B), the annulus cavity profiles 184A–184L are formed. The slide insert member 26, in the contracted position, also forms a rectangular extension cavity for entry by the fluid plastic, with the rectangular extension cavity being generally seen from 200A–200L and with the rectangular cavities being in communication with the annulus cavity profiles 184A–184L. Also patterned by the disclosed design is the wing tip cavities 202A–202L that are formed once the slide insert member 26 is in the contracted position. The wing tip cavities 202A–202L are in communication with each other as seen in FIG. 8 such that once the molding process has been completed and the row has been ejected, the row is linked together. Also included will be the water channels 204, 206 for inputting, circulating and withdrawing a water stream from the insert member 26.

The cold half 6 is also depicted in FIGS. 5A–5B which includes the bottom clamp plate 52 that is attached to the retainer plate 54. The retainer plate 54 is selectively attachable to the ejector plate 60, with the ejector plate 60 containing the ejector insert 146 and the stripper insert 144 as previously described.

As shown in FIG. 5B, the invention includes the row of core pins 68A–68L and the concentrically placed tubular members 188A–188L. Therefore, a series of annuluses 190A–190L are formed for channeling the water as previously defined. FIG. 5 also depicts the water channels 166 and 168 that allow for channeling the water into and out of the tubular members 188A–188L. As shown, the water channel 166 connects with the inner bore and the water channel 168 connects with the annulus space 190 with the direction of flow in the preferred embodiment being from the water channel 166 through the inner bore, into the annulus space 190 and into the water channel 168 thereby cooling the core pins.

Figure 6A:
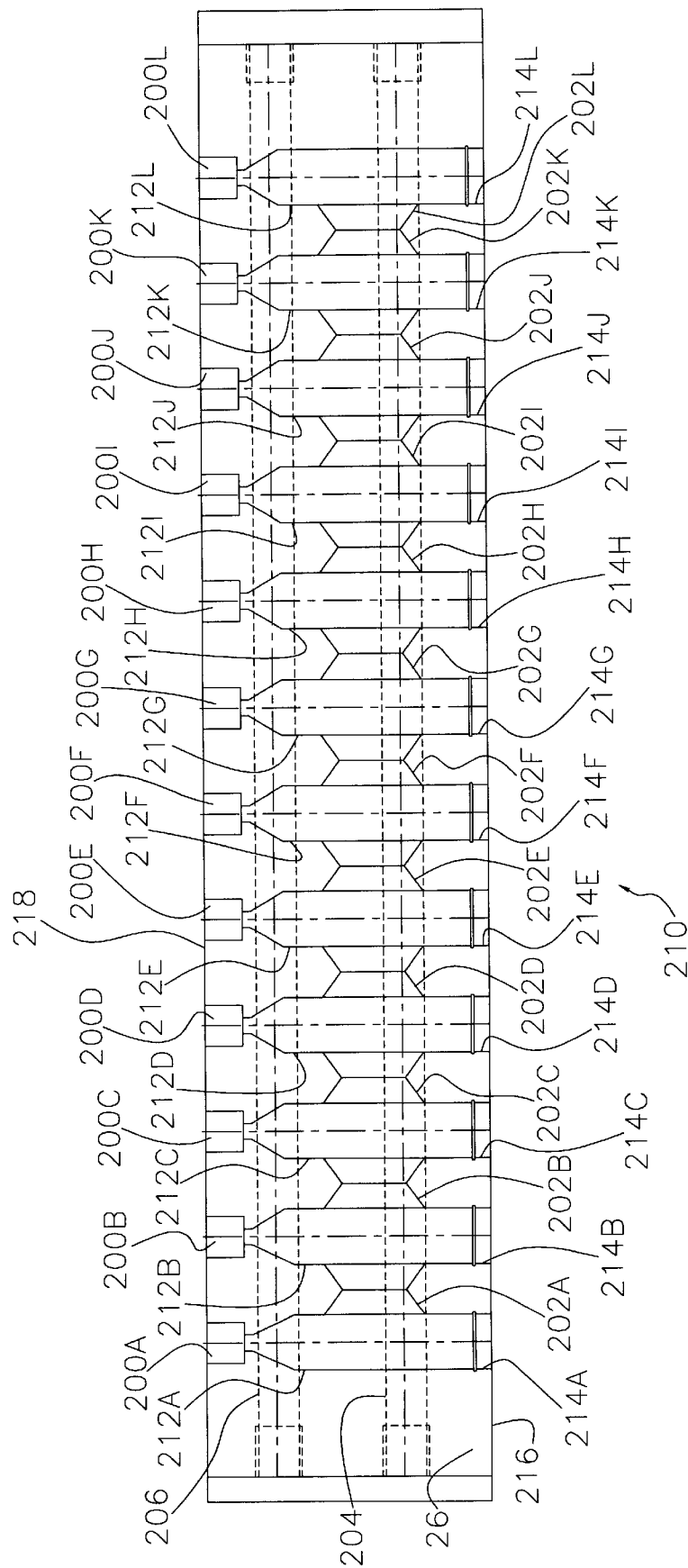
FIG. 6A, is the top view of one half of a slide insert member.
Figure 6B:
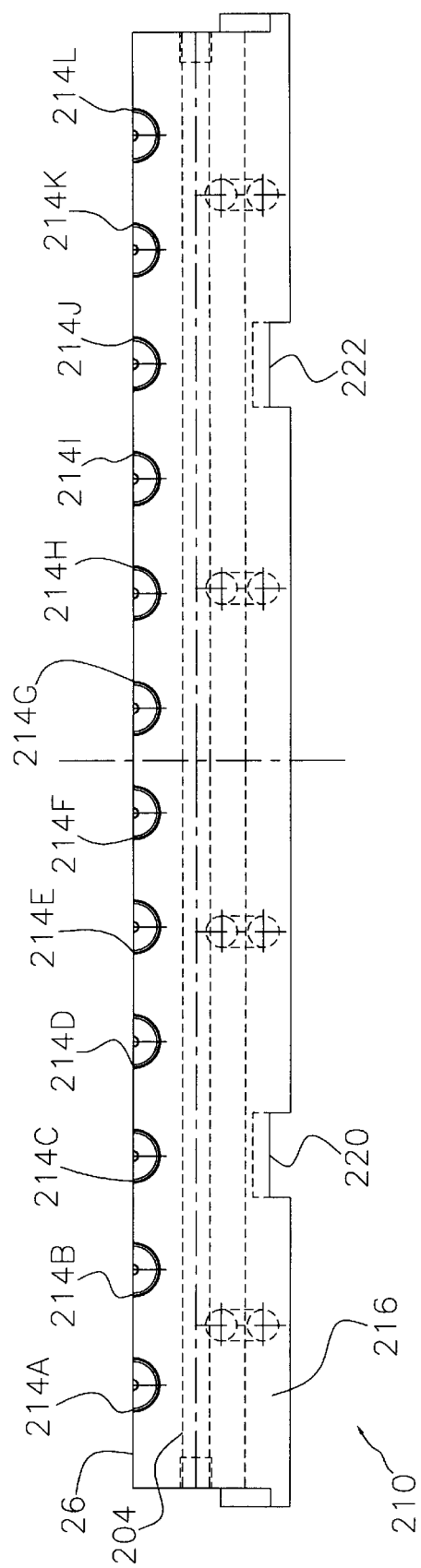
FIG. 6B is the front view of the slide insert member half of FIG. 6A.
Figure 6C:
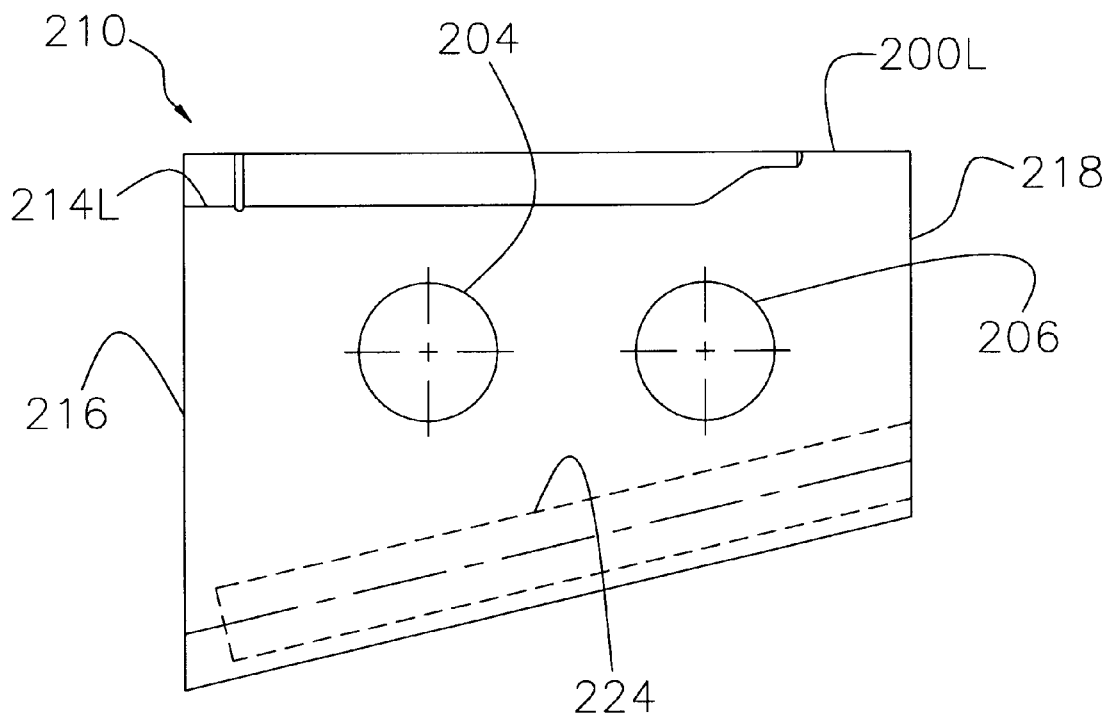
FIG. 6C is the side view of the slide insert member half of FIG. 6A.

Referring now to FIGS. 6A, 6B, and 6C, the cross-sectional view of one half of a slide insert member 26 will now be described. It should be noted that the two halves comprise the slide insert member 26. The FIG. 6A slide insert member half will be referred to as 210. Thus, the slide insert member half 210 includes the indentation profiles that forms the rectangular extension cavities 200A–200L, the container profile cavities 212A–212L, and the wing tip cavities 202A–202L. The container profile cavities 212A–212L will extend to the open end 214A–214L, with the open ends 214A–214L concluding at the insert slide face 216. The slide insert half also has the opposite slide face 218 that abuts the gate insert 20.

The FIG. 6B depicts the front view of the slide insert member half 210. Thus, the open ends 214A–214L are represented along the insert slide face 216. The front view also illustrates the notches 220 and 222. Referring now to FIG. 6C, the side view of the slide insert member half 210 will now be described. Thus, this view shows the member half 210 rotated so that the wedge configuration is depicted. As shown, the insert slide face 216 is longer than the insert slide face 218. The FIG. 6C also depicts the open end 214L and ensuing profile that extends to the rectangular extension 200L. The indention 224 is used for placement of the biasing means with the biasing means used to bias the insert member outward. In the preferred embodiment, the biasing means is a conical spring.

Referring now to FIG. 7, the core pin 68 will be described in greater detail. The flanged section 179 contains a radially flat surface 230 for placement of a seal means, such as an o-ring, for sealing with the face of the bottom clamp plate 52. The first cylindrical surface 178 leads to the chamfered surface 180 which in turn extends to the second cylindrical surface 182. A conical surface 232 stretches from surface 182, with the conical surface concluding at the apex 234. Once the apex area 234 has been inserted into the insert member, the apex 234 and insert member will cooperate to allow flow of the fluid plastic about the core pin 68. The core pin 68 also contains the inner bore 186, with the inner bore 186 extending to the closed end 236. As described earlier, the tubular member 188 will be disposed therein so that a fluid may be pumped down the tubular member 188 and up through the annulus 190 thus formed.

In FIG. 8, a perspective view of a row of molded hollow plastic articles will now be described. This is the row of articles of manufacture that is ejected via the ejector plate according to the teachings of the present invention. The rectangular extension cavity formed the rectangular extension top 240A–240L, and the wing tip cavity formed the wing tip arm 242A–242L. There is also the opened end 244A–244L of the container, with the plastic body of the container being represented by the numerals 246A–246L, with the row of containers 246A–246L being a product of the described process. It should also be noted that according to the teachings of the present invention, the design and resin herein disclosed, allows for minimum formation of a seam parting line. Whereas, in the prior art, significant seam parting lines will be formed in the casting of vials, for instance, in blow molding and/or injection techniques.

The method of molding a container with according to the teachings of the present invention will now be described. First, the plastic is heated so that a fluid plastic is formed which is then channeled into the manifold 18/80. The fluid plastic will also be heated within the manifold and is further heated via the cast heaters 90. The cast heaters allow for the fluid plastic to be held at a relatively constant temperature. The fluid plastic will be channeled through the first member 4 and into the first slide 26 and channeled through the first member 4 and into the second slide 28. The piston 8 will be moved so that the second member 6 contacts the first slide insert 26 and the second slide insert 28 which in turn will contract the first slide 26 and the second slide 28 so that the previously described cavity profiles are formed. Continued advancement of the second member 6 will place the plurality of core pins into the cavity profiles. The controller means 46 will then inject the fluid plastic into the cavity profiles and the plastic is cast about the plurality of core pins so that a container is formed.

The method also includes introducing a first water stream into the first slide 26 via the water input lines 38/40 through the channels 204, 206, as well as introducing the first water stream into the second slide 28 via the water input lines 42/44 through the channels, with the water being circulated through and exited from the first member 4. The method will further include introducing a second water stream into the plurality of core pins 68/70 and circulating the second water stream within the plurality of core pins 68/70 and in turn exiting the second water stream from the plurality of core pins 68/70. During the process, the controller means 46 causes the measurement of the temperature of the fluid plastic within the first member 4 and in turn adjusting the temperature of the heaters in order to maintain the fluidity of the plastic. The method further comprises measuring the temperature of the fluid plastic within the first slide 26 and second slide 28 and in turn adjusting the temperature of the cast heaters 90A–90L in order to maintain the proper fluidity.

The method also includes reciprocating the piston 8 away from the end face 24 of the first member 4 so that the first slide 26 and second slide 28 are allowed to expand. As the second member 6 is withdrawn from contact with the hot half 4, the core pins 68/70 will have disposed thereon the deposited plastic. Next, the secondary piston 67 is allowed to advance so that the ejector plate 60 traverses the plurality of core pins 68/70 ejecting the containers from the plurality of core pins 68/70 so that the articles shown in FIG. 8 are formed.

The containers thus produced may be used a vial for medical purposes. Therefore, the method may further include providing a drug in a tablet embodiment and inserting the tablet into the open end of the vial (container). Next, the open end of the vial may be sealed so that the vial is a closed container. Alternatively, the method may include providing a drug in a liquid form and inserting the liquid into the open end of the vial, and thereafter, sealing the open end of the vial so that the vial is a closed container. The open end may be sealed via conventional means such as heat sealing. With the teachings of this invention, an exact amount of medicine may be placed within the vial, with the exact prescription depending on the patient's particular medical requirements.

Changes and modifications in the specifically described embodiments can be carried out without departing from the scope of the invention which is intended to be limited only by the scope of the appended claims.

I claim:

1. A method of molding a plurality of medical vials with a mold, said mold comprising a first member having a first end and a second end, including an opening defined within said first end; a manifold member operatively attached to said second end of said first member for channeling a plastic fluid to an insert means, said insert means being positioned within the opening located within said first member, said insert means containing a first slide and a second slide, with said first slide and second slide having an extended position and a contracted position and a first spring and a second spring which bias said first slide and said second slide in the extended position and a second member having a first end and a second end, and wherein said first end of said second member has attached thereto a plurality of core pins contained therein; an ejector plate attached to said second member, said plurality of core pins being disposed therethrough; and, a piston adapted to said second end of said second member for reciprocating said second member into engagement with said insert means, the method comprising:

heating a plastic so that the plastic if fluidized;

channeling the plastic fluid into the manifold;

injecting the plastic fluid into the manifold;

maintaining the plastic fluid within said manifold at a constant temperature;

moving said piston so that said first end of said second member contacts said first slide and said second slide;

injecting the plastic fluid through said first member;

contracting said first slide and said second slide so that said first end of said second member abuts the first end of said first member;

forming a plurality of cavity profiles within said contracted first slide and said second slide and wherein said plurality of cavity profiles are in communication forming a plurality of arm contours;

placing said plurality of core pins into said plurality of cavity profiles so that said plurality of core pins are free standing within said plurality cavity profiles;

injecting the plastic fluid into said plurality of cavity profiles and into said plurality of arm contours;

injecting the plastic fluid about said plurality of core pins so that the plurality of medical vials are formed interconnected together via a plurality of arms;

channeling a water stream through said mold:

reciprocating the piston away from the first end of said first member;

allowing the first slide and second slide to expand;

reciprocating the piston so that the ejector plate traverses the plurality of core pins;

electing the plurality of medical vials from the plurality of core pins, and wherein the plurality of medical vials comprises a first end that is closed and a second end that is opened.

2. The method of claim 1 wherein said first member further comprises cast heaters operatively associated with said first slide and said second slide, and wherein the step of maintaining the plastic fluid at a constant temperature comprises:

heating the plastic fluid with said cast heaters;

and wherein the step of channeling the plastic fluid through said first member and into said insert means includes flowing the plastic fluid through said cast heater so that the plastic fluid is maintained at a constant temperature.

3. The method of claim 2 wherein the step of channeling the water stream through said mold comprises:

introducing a first water stream into said first slide;

introducing the first water stream into said second slide;

circulating the first water stream within said first slide and said second slide;

exiting the first water stream from said first slide and said second slide.

4. The method of claim 3 wherein the step of channeling the water stream through said mold further comprises:

introducing a second water stream into said plurality of core pins;

circulating the second water stream within said plurality of core pins;

exiting the second water stream from said plurality of core pins.

5. The method of claim 4 wherein the step of maintaining the plastic fluid within said manifold at a constant temperature further comprises:

measuring the temperature of said plastic fluid within said manifold;

adjusting the temperature of said heater in order to maintain the plastic fluidity.

6. The method of claim 5 wherein the plastic fluid is a metallocene resin.

7. A method of producing a plurality of interconnected medical vials in a mold, the mold comprising a first member having a first end and a second end, including an opening defined within said first end; a manifold member operatively attached to said second end of said first member for channeling a plastic fluid to a first slide and a second slide positioned within the opening, with said first slide and second slide having an extended position and a contracted position, and a means for extending said first slide and said second slide to the extended position; a second member having a first end and a second end, and wherein said first end of said second member contains a plurality of core pins contained therein; an ejector plate selectively attachable to said second member, said plurality of core pins being disposed therethrough; and, a piston adapted to said second end of said second member for reciprocating said second member into engagement with said first slide and said second slide, the method comprising:

heating a plastic so that the plastic fluid is formed;

channeling the plastic fluid into the manifold;

heating the plastic fluid within said manifold;

injecting the plastic fluid through said first member and into said first slide and said second slide;

moving said piston so that said second member contacts said first slide and said second slide;

contracting said first slide and said second slide so that said contracted first slide and said second slide form a plurality of cavity profiles and wherein said plurality of cavities are linked together by a plurality of arms, said cavity profiles having a first end and a second end, with the first end containing a wing tip contour, and the second end being opened;

placing said plurality of core pins into said plurality of cavity profiles and wherein said plurality of core pins are in a free standing arrangement within said cavity profiles;

injecting the plastic fluid into said cavity profiles;

injecting the plastic fluid about said plurality of core pins so that the plasticize fluid is disposed about said core pin so that the plurality of interconnected medical vials are formed;

reciprocating the piston away from the first end of said first member;

allowing the first slide and second slide to expand;

reciprocating the piston so that the ejector plate axially traverses the plurality of core pins:

ejecting the plurality of interconnected medical vials from the plurality of core pins and wherein said plurality of interconnected medical vials contains a winged tip extension on the first end and a cylindrical outer diameter on the second end.

8. The method of claim 7 further comprising:

providing a drug in a tablet embodiment;

inserting the tablet into the open end of said plurality of interconnected medical vials;

heat sealing the open end of said vial so that said plurality of interconnected medical vials are a plurality of closed containers.

9. The method of claim 7 further comprising:

providing a drug in a liquid embodiment;

inserting the liquid into the open end of said plurality of interconnected medical vials;

heat sealing the open end of said so that the plurality of interconnected medical vials are a plurality of closed containers.

10. The method of claim 9 wherein the plastic is a metallocene resin.

* * * * *

UNITED STATES PATENT AND TRADEMARK OFFICE
CERTIFICATE OF CORRECTION

PATENT NO. : 6,101,791
DATED : August 15, 2000
INVENTOR(S) : Kent A. Louviere

It is certified that error appears in the above-identified patent and that said Letters Patent is hereby corrected as shown below:

Claim 1,
Line 20, change "if" to -- is --;
Line 49, change "electing" to -- ejecting --.

Signed and Sealed this

Twenty-fifth Day of December, 2001

Attest:

Attesting Officer

JAMES E. ROGAN
Director of the United States Patent and Trademark Office